Inventors:
Stuart D. Pool
Elof K. Karlsson
By: Paul O. Pippel
Attorney

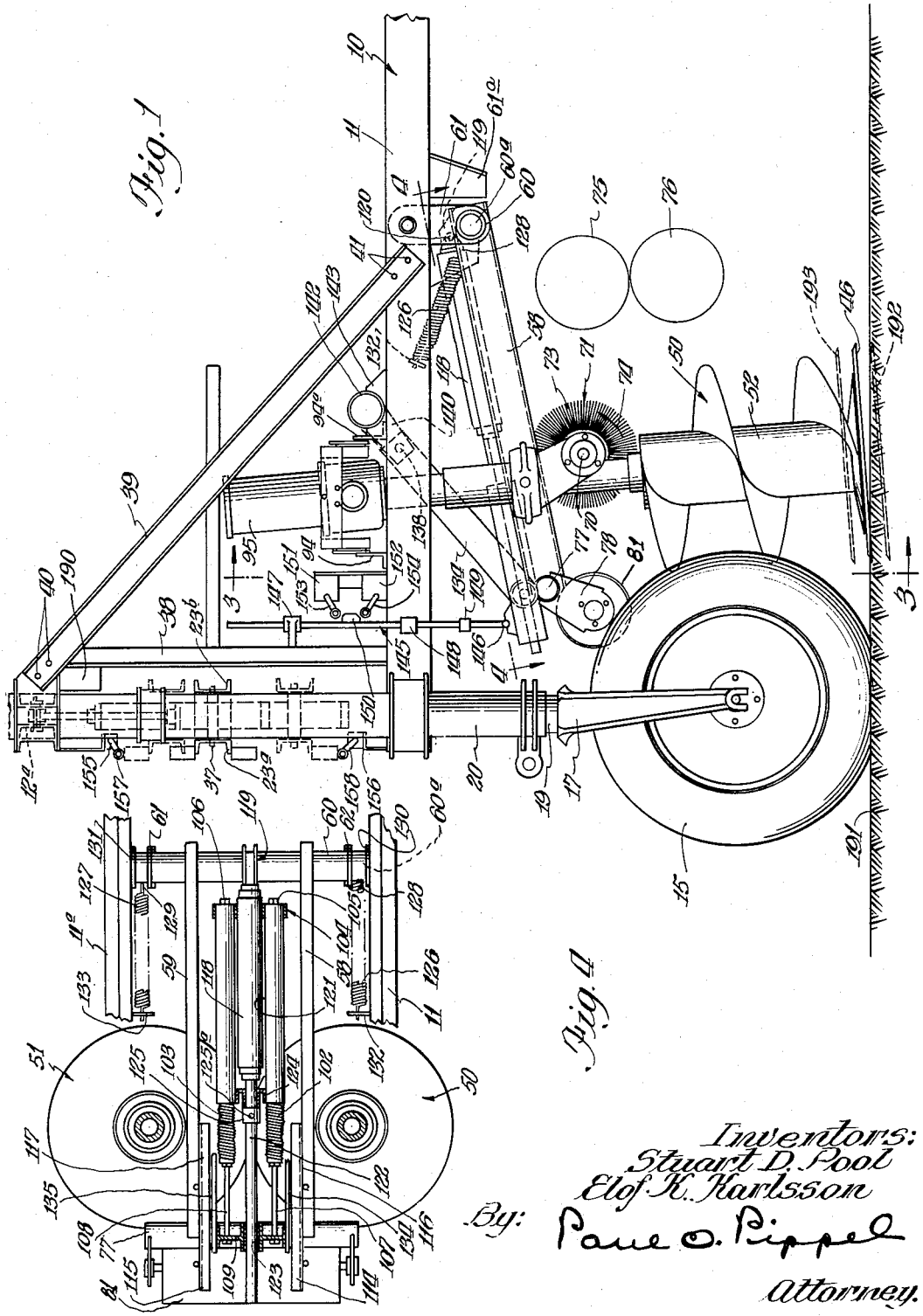

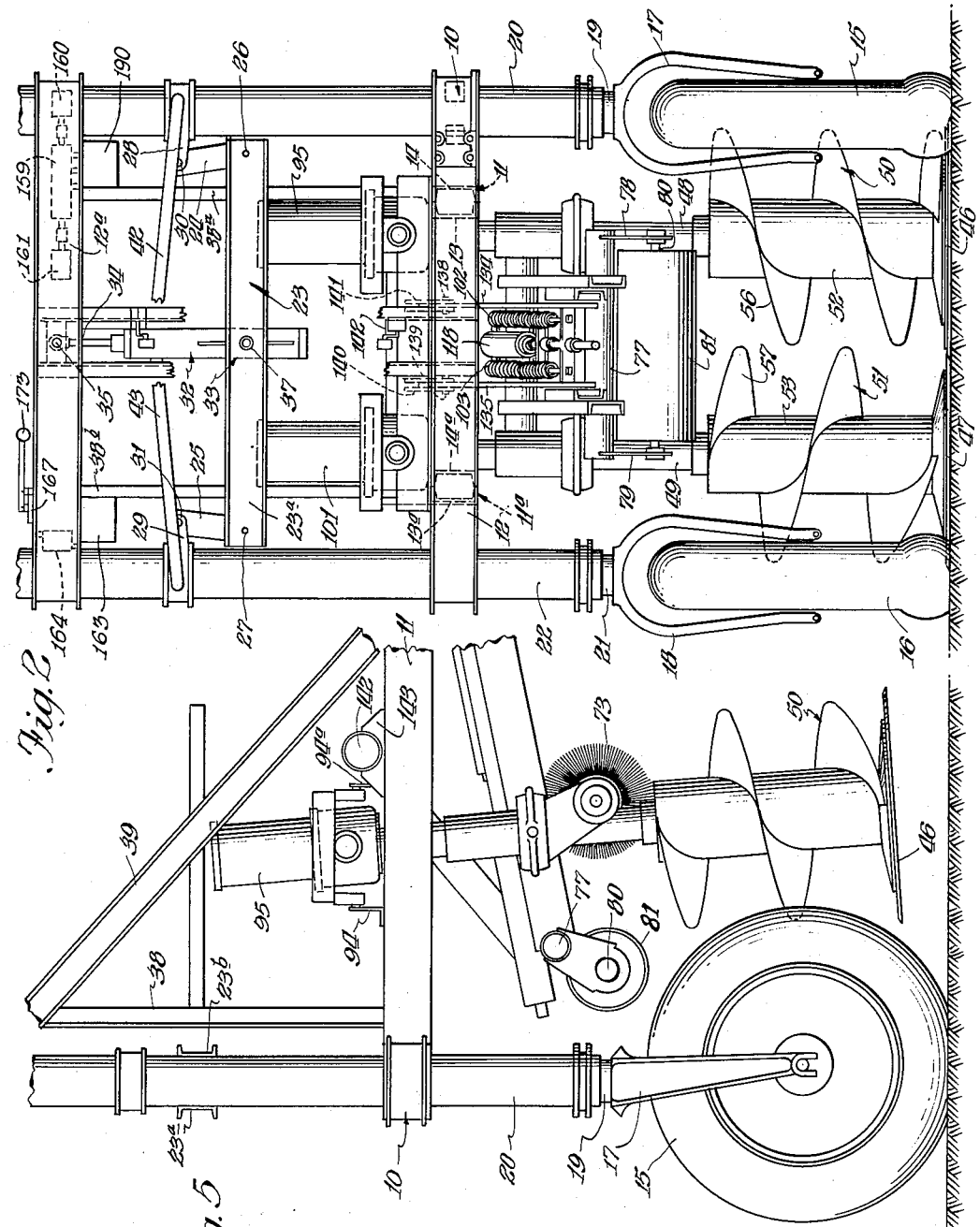

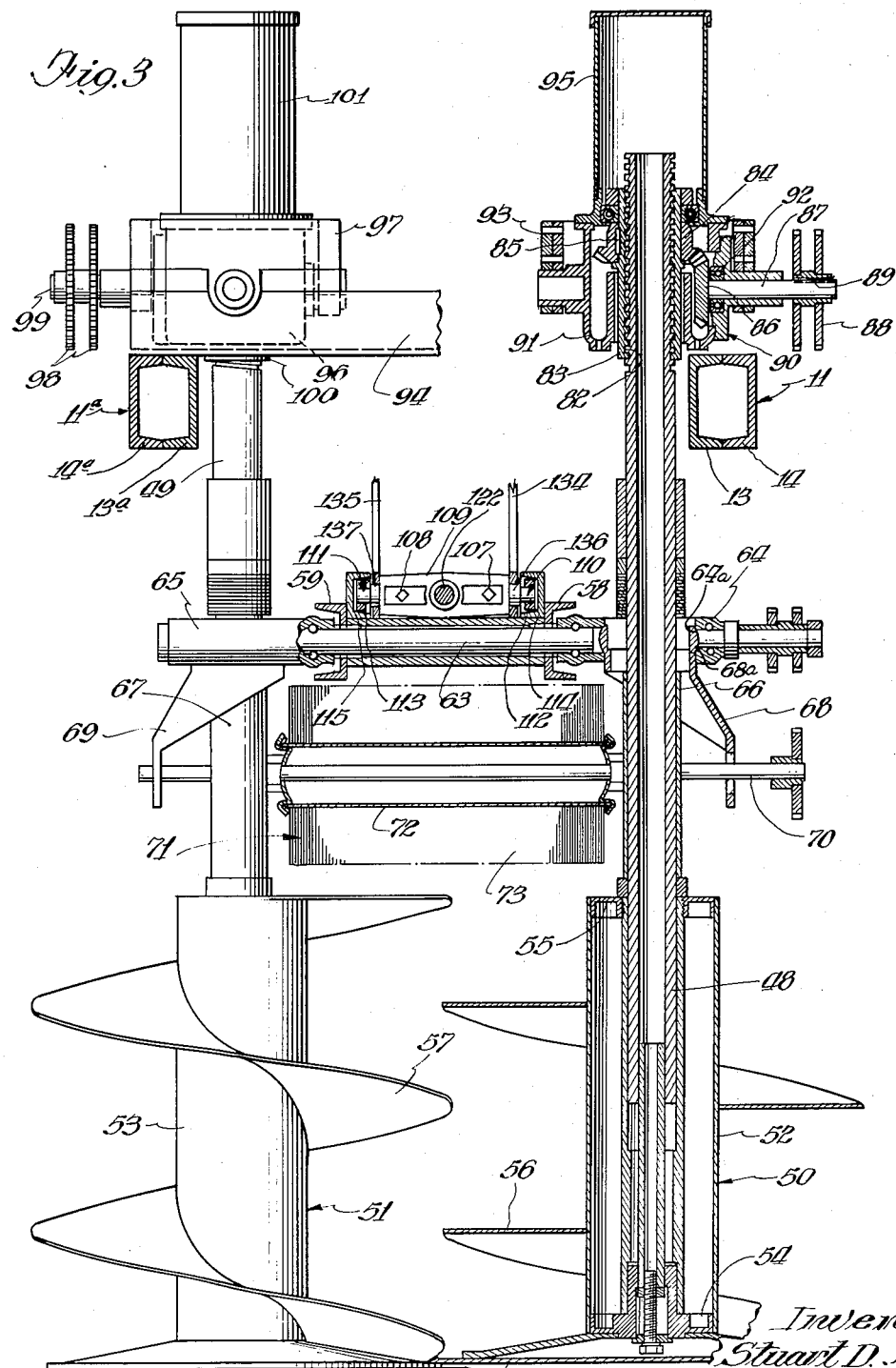

United States Patent Office 2,748,552
Patented June 5, 1956

2,748,552

ROTARY CUTTING ASSEMBLY WITH TORQUE CONTROL FOR DRIVING AND POSITIONING CUTTING ASSEMBLY

Stuart D. Pool and Elof K. Karlsson, East Moline, Ill., assignors to International Harvester Company, a corporation of New Jersey Application November 2, 1951, Serial No. 254,604

15 Claims. (Cl. 56—15)

This invention relates to a new and improved torque control for vertical positioning of cooperative disk cutters.

The present application is directed to harvesting machines such as a cane harvester. The harvesting of sugar cane by mechanical means is of fairly recent origin and up to the present time has not been too successful nor have the present machines been widely used by the growers of sugar cane. Sugar cane grows in relatively large diameter stalks of substantial height and in clusters from root formations which are known as stools. The stalks have a leafy foliage at the upper ends thereof, but the usable sugar content of the plant is contained entirely within the stalk and with the greater percentage thereof in the lower end of the stalk. It is therefore essential that the high sugar content portion of the stalk adjacent the root be harvested whether the harvesting is manual or by mechanical means.

A principal object of this invention is to provide cooperative disk cutters arranged and constructed to cut the butt ends of stalks such as cane stalks and to cause the cutters to engage and cut the stalks at a level dependent upon the amount of torque required to effect the cutting plus the torque required to force the cutters a predetermined distance below the surface of the ground.

An important object of this invention is to provide a harvesting machine with cooperative stalk cutting disks arranged so that the disk cutters will be pushed against the surface of the ground by any desired degree of force and/or any desired depth into the ground.

Another important object of this invention is to supply driving means for cooperative cutting disks wherein the driving means normally urges the cooperative cutting disks upwardly.

Another and further important object of this invention relates to a rotatable driving means for cooperative harvesting elements and including the driving through screw means so that the harvesting elements may automatically yield upon the attainment of any predetermined torque load.

A still further important object of this invention is the provision of means in cooperative harvesting elements of the type including substantially horizontal disk cutter members and a vertically disposed auger conveyor for automatically regulating the operation level dependent upon the torque load imposed on said harvesting elements.

Another and still further important object of this invention is to provide means in vertically disposed cooperative cutters and augers for automatic yieldable swinging rearwardly and climbing upwardly upon the cutters striking a foreign obstruction.

Still another important object of this invention is to provide hydraulic means for regulating the effective weight of cooperative harvesting elements by varying the length of extension springs, and to directly vary the height and depth control of the cooperative harvesting elements dependent upon the position of the hydraulic means.

Another important object of this invention is the provision of means in a cane or like harvester for raising and lowering cooperative harvesting elements depending directly upon the torque load imposed on the harvesting elements and preliminarily moving the elements through a predetermined range of movement and thereafter effecting a raising and/or lowering of the main harvesting machine frame whereby the relative change in relationship of the harvesting elements with respect to the main frame is minimized.

Another and still further important object is to provide a single hydraulic system for a cane or like harvester having cooperative harvesting elements adapted to cut cane stalks or the like at a level dependent upon any predetermined torque load and to automatically effect movement of auxiliary hydraulic means for raising and lowering the main frame of the harvester in response to limited movement of the harvesting means.

A still further important object of this invention is to supply a cane or like harvester with vertically shiftable harvesting elements having electrical and mechanical control means in cooperation with hydraulic means for regulating the torque load of the harvesting elements and automatically regulating the depth below the ground level at which the cane is cut.

Still another object of this invention is to provide a cane or like harvester with a main frame and an auxiliary frame hinged for swinging movement with respect to the main frame, the auxiliary frame including cooperative disk cutters and vertically disposed augers, a stalk bending device, and a stalk moving device.

Other and further important objects of this invention will become apparent from the disclosures in the following specification and accompanying drawings.

In the drawings:

Fig. 1 is a side elevational view of a cane harvester employing the mechanisms of this invention.

Fig. 2 is a fragmentary front elevational view of the device as shown in Fig. 1.

Fig. 3 is an enlarged sectional view taken on the line 3—3 of Fig. 1.

Fig. 4 is a sectional view taken on the line 4—4 of Fig. 1.

Fig. 5 is a side elevational view of the device similar to Fig. 1 with the harvesting elements in raised position.

As shown in the drawings:

Figure 6:
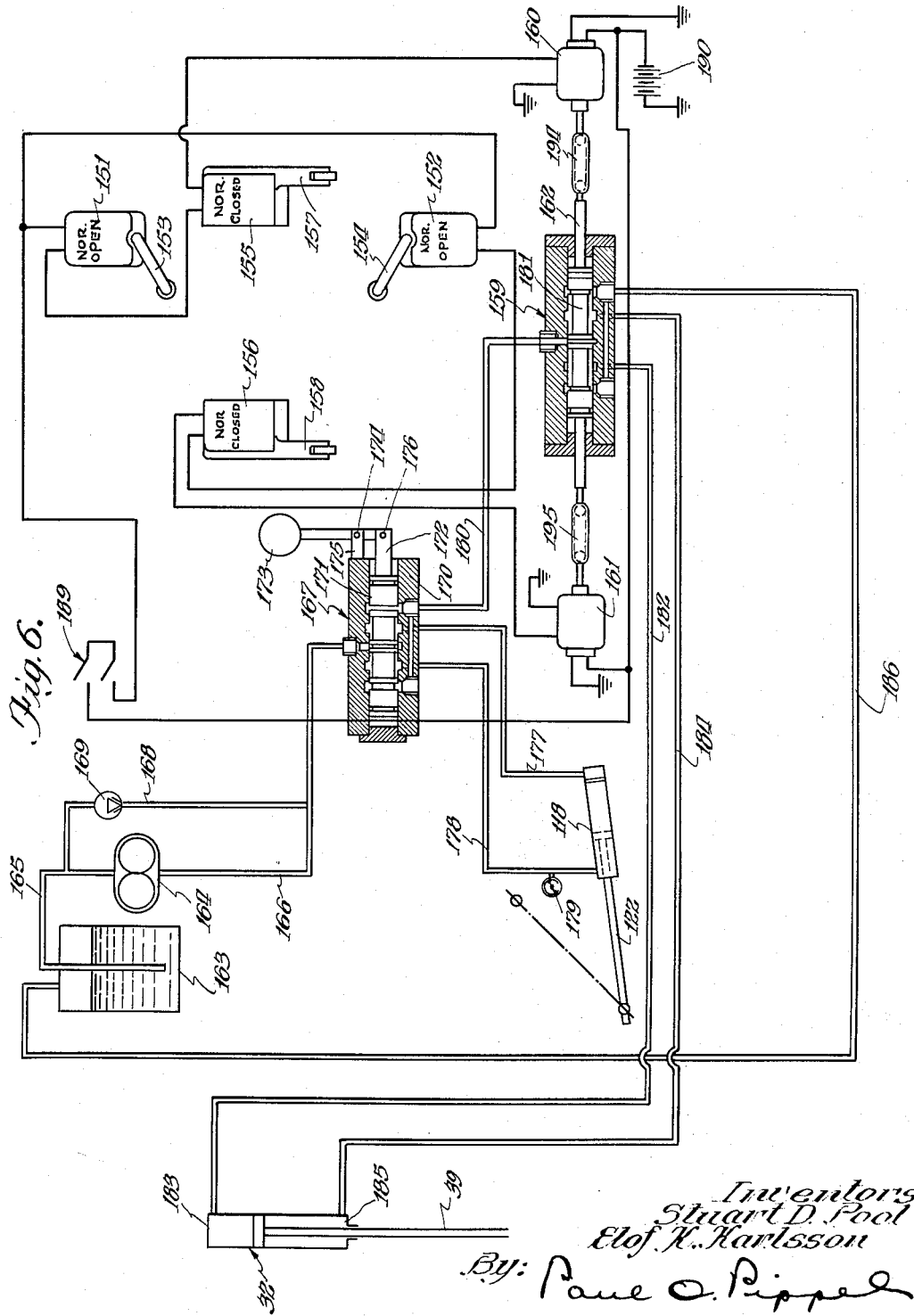
Fig. 6 is a diagrammatic view showing the hydraulic and electrical circuits employed in this machine.

The reference numeral 10 indicates generally a main supporting frame of a cane harvester. The main supporting frame structure includes frame members 11 and 11a extending along both sides of the cane harvester and a front cross beam 12 around the front thereof. Spaced above the cross beam 12 is a second cross beam 12a. As best shown in Fig. 3, the beams 11 and 11a are formed by two channel members 13 and 14 and 13a and 14a respectively, placed with the channel openings facing each other and the channels welded together to form a rigid tubular beam. The forward end of the harvesting machine is supported by steerable wheels 15 and 16. The steerable wheels are separately carried on yoke members 17 and 18 respectively. The yoke 17 has a vertically disposed shaft 19 rigidly fastened thereto. The shaft 19 is journally mounted for rotation within a sleeve bolster member 20 which in turn is mounted for vertical sliding movement within the vertically spaced front frame cross beams 12 and 12a. The yoke 18 on the other side of the cane harvester similarly includes a vertical shaft 21 fastened thereto for concurrent rotation. The shaft 21 is journally carried within a sleeve bolster 22 for separate rotational movement and concurrent vertical movement. The bolster 22 is slidably mounted for vertical movement through and with respect to the front frame members 12 and 12a in the same manner as the bolster 20.

It is desirable that all four wheels of the cane harvester be maintained in contact with the ground at all times, and that as little strain as possible be transmitted to the mobile frame when passing over uneven terrain. In order to accomplish this result an equalizing tie bar is provided at 23 between the bolsters 20 and 22. Link members 24 and 25 are adapted to be pivotally fastened at 26 and 27 to the tie bar 23. The links 24 and 25 extend upwardly with a slight angular inclination inwardly toward each other. The upper ends of each of the links 24 and 25 hingedly receive links 28 and 29, respectively, at 30 and 31. The links 28 and 29 are fixedly attached to the bolsters 20 and 22, respectively, and do not have relative movement with respect to the bolsters. The center of the tier bar 23 carries the lower end of a hydraulic cylinder 32 at 33. An upwardly extending piston rod 34 is hingedly mounted by means of a pin 35 to the beam 12a at the center and top of the cane harvester. The hydraulic cylinder 32 is pivotally connected to the horizontally disposed the rod beam 23 by means of a trunnion pivot 37. When fluid under pressure is admitted to the hydraulic cylinder 32, the piston rod 34 is adapted to be extended upwardly from the cylinder with the result that the tie rod 23 is caused to be moved downwardly with respect to the cane harvester frame 10. The downward movement of the tie rod effects a corresponding downward movement of the bolsters 20 and 22 through the linkages 24 and 28 and 25 and 29. Slight variations in the horizontal level of the wheels 15 and 16 are compensated for through the medium of the tie rod 23 and its associated linkage. As best shown in Fig. 1, the tie rod 23 comprises a pair of spaced apart channel members 23a and 23b. The pin 37 is shown extending between the spaced channels 23a and 23b, thus providing for attachment of the hydraulic cylinder 32 to the pin and imparting vertical force to the tie rod 23 through the intermediate link members 24, 25, 28, and 29 and thus to the bolsters 20 and 22. The frame structure further includes members 38 and 39 for maintaining the vertically spaced apart beam 12a in fixed relationship with respect to frame members 11 and 12. The vertically disposed angle members are generally identified as 38 and are designated specifically as 38a and 38b to indicate their horizontal spacing. As shown in Fig. 1, the angle frame member 38 is vertically disposed between the beams 11 and 12a and the channel frame member 39 is inclined between the same two beam members in order to give a bracing rigidity to the frame structure 10. The channel frame member 39 is riveted or otherwise fastened to the beam 12a at 40 and to the beam at 41.

As best shown in Fig. 2, the bolsters 20 and 22 are rotated for accomplishing steering of the wheels 15 and 16 by means of tie rods 42 and 43 respectively. The tie rods 42 and 43 move outwardly and inwardly by means, not shown, and effect rotation of the shafts 19 and 21 located inside the bolsters 20 and 22 by means not shown. Inasmuch as the steering forms no part of the present invention the particular mechanical means for accomplishing it has not been shown.

The harvesting elements of the present harvesting machine comprise a pair of inwardly rotating cooperative cutting disks 46 and 47. The disks are substantially horizontally disposed with a slight inclination forwardly and downwardly. The disks 46 and 47 are carried on substantially vertically disposed spaced apart shafts 48 and 49. Directly above the circular disks 46 and 47 there are positioned auger conveyor elements 50 and 51 respectively. These augers include centrally disposed core members 52 and 53 concentric with the vertical shafts 48 and 49 respectively. As best shown in Fig. 3, spacer members 54 and 55 are positioned at the lower and upper ends of the core 52 between the central shaft 48 and the inner surface of the cylindrical core 52. The auger conveyors 50 and 51 further include spirally wound flights 56 and 57 respectively. It is the function of these cooperative harvesting elements to cut stalks at their lower butt ends and thereupon elevate the butt ends of the stalks by reason of the interengagement of the auger flight 56 and 57, whereby the cane is shifted from a vertical growing position to a horizontally disposed position.

Spaced apart frame arms 58 and 59 are fixedly attached to a sleeve 60 which is journally mounted on a cross shaft 60a. The shaft 60a is fixedly carried on spaced apart similar brackets 61 and 62 depending from the side frame members 11. The arms 58 and 59 and the integral sleeve 60 constitute a carrier frame which is hinged with respect to the main frame of the cane harvesting machine. The arms extend forwardly of the direction of travel of the cane harvester and are normally inclined slightly downwardly. The hinged arms 58 and 59 are adapted to carry the relatively vertically disposed harvesting elements which, as previously stated, comprise the cooperative circular cutting disks and the vertically conveying cooperative auger means. A cross shaft 63 is journally mounted within the spaced apart arms 58 and 59 at a position adjacent the forward ends thereof. Ring type bearing members 64 and 65 are adapted to surround the vertical shafts 48 and 49 respectively. Intermediate the bearings 64 and 65 are sleeves 66 and 67. The bearings 64 and 65 are equipped with ball sockets 64a for engagement by ball members 68a. The cooperative ball and socket joints are thus disposed between the shaft 63 carried on the arms 58 and 59 and the vertical shafts 48 and 49 to thus give the harvesting elements some latitude of self-aligning movement. Bracket members 68 and 69 depend from the cross shaft 63 and journally support a transversely disposed shaft 70. The shaft 70 is adapted to carry a brush-type feeding roll 71. The brush roll 71 includes a central metal core 72 and radially extending bristle members 73. The roller feed brush 71 is cylindrical in shape and is positioned between the vertical shafts 48 and 49 at the upper ends of the auger conveyor flight 56 and 57. Thus, as cane stalks are fed upwardly by the cooperative efforts of the vertically disposed auger conveyors they will thereafter be engaged by the roller feeding brush 71 which is rotating in the direction indicated by the arrow 74 in Fig. 1. It will thus be apparent that the stalks are propelled rearwardly lying in a horizontal plane to be subsequently engaged by cooperative feeding rolls 75 and 76, whereafter the stalks are delivered to a trailing wagon (not shown) or further treated by means not shown in this application.

As best shown in Figs. 1 and 2, the forwardly extending arms 58 and 59 carry a second cross shaft 77 at their extreme forward ends. Brackets 78 and 79 are fixed to and depend from the cross shaft 77 and receive and support a journaled cross shaft 80. A cylindrical drum 81 is fixed to the shaft 80 and thus the drum 81 is turnable for free or driven rotation. The function of the roller 81 is to cause the upper ends of the standing cane stalks to be pushed forwardly and downwardly toward the horizontal upon forward movement of the cane harvester through fields of standing cane. This insures that the butt ends of the stalks will be engaged by the cooperative circular cutter disks 46 and 47, whereafter the cut or freed butt ends are then tilted upwardly into the scope of movement of the cooperative augers 50 and 51. The relatively large diameter drum 81 is not necessarily positively driven but, as previously stated and shown is permitted to rotate freely and is driven by the movement of the stalks as they pass thereunder. Thus the drum 81 acts to constantly present a new surface to the stalks to thereupon efficiently depress the stalks and direct them into the harvesting elements. The large diameter of the drum or roll 81 eliminates any possible "hairpinning" or tangling of stalks therearound.

As best shown in Fig. 3, the upper end of the harvesting element shaft 48 is externally threaded as shown at 82. A sleeve-type nut member 83 is internally threaded and engages with the externally threaded member 82 of the sleeve shaft 48. A bevel gear 84 is keyed as shown at 85 to the nut 83 whereby upon rotation of the gear 84 similar rotation is imparted to the sleeve nut 83. A cooperative bevel gear 86 is mounted on a shaft 87. The shaft 87 is disposed at right angles to the harvester element shaft 48. Driving sprockets 88 are keyed as shown at 89 to the shaft 87, and thus rotation thereof will impart direct rotation to the sleeve nut 83 which becomes a power driven nut whereby rotational drive of the harvester element, including the cutting disk 46 and the auger conveyor 50, will take place through the medium of the engaging screw threads 82 and the nut 83. The pitch of the screw threads 82 should be of such lead that shafts 48 and 49 may be driven by nuts 83 and also shafts 48 and 49 may climb through nuts 83 when the rotation of shafts 48 and 49 is sufficiently opposed. The pitch angle range is something between 0° and 90° and depends on various factors such as friction developed between the members. The shaft 87 and its bevel gear 86 are carried in a gear housing 90. The housing 90 is provided with an annular well 91 for reception of the vertically disposed bevel gear 86 and to provide an oil carrying chamber for proper lubrication of the movable elements of this unit. A bearing member 92 is positioned within the housing 90 and around the transversely disposed shaft 87 to be externally driven. A gimbal ring 93 carries the gear housing 90 in a manner permitting relative universal movement. The gimbal ring 93 is carried by cross frame members 94 and 94a which are mounted on the spaced apart beams 11 and 11a of the main frame.

It will thus be apparent that with equal and opposite torque loads upon the shaft 48 there will be an uninterrupted rotational drive from the nut 83 to the shaft 48 by reason of the engaging screw threads 82. However, with relative changes in torque load on the shaft 48 there will be occasioned an upward or downward movement of the shaft 48 with respect to the rotating driving nut 83, and it is with this principle of mechanics that the cane harvester of this invention operates. A cylindrical closed-top shield 95 is mounted on top of the gear housing 90 and constitutes an enclosure for the vertically movable shaft 48. Although the operating mechanism for the harvesting element shaft 49 is not shown in cross-section, the mechanism is identical to that shown and described for the shaft 48. The gear housing 96 is carried on a gimbal ring 97 in the same manner as the gimbal ring 93 and is similarly supported on the cross members 94 and 94a. Drive sprocket members 98 are fastened to a shaft 99 which is comparable to the shaft 87 in the gear housing 90 and thus similarly effects rotation of a sleeve nut 100 in the same manner as the adjacent unit shown in cross-section. An inverted can-type enclosure shield 101 is comparable to the shield 95 and forms an enclosure for the vertically movable shaft 49.

As best shown in Fig. 4, coil spring members 102 and 103 of the extension type are mounted at one end within a container or bracket 104 at 105 and 106 respectively. The other ends of the coil spring members 102 and 103 are provided with bolts 107 and 108, respectively, on their forward ends. A bracket means 109 is adapted to receive and be attached to the bolts 107 and 108. The bracket means is fixed with respect to the spring bolts 107 and 108 and will effect corresponding longitudinal movement of the bolts. A stub shaft 110 extends laterally from one side of the bracket means 109 and similarly a spaced apart aligned stub shaft 111 extends laterally from the other side of the bracket means. The stub shafts 110 and 111 are adapted to receive roller members 112 and 113, respectively, for engagement within inwardly facing open channel track members 114 and 115. The channel track members 114 and 115 are welded or otherwise fastened at 116 and 117, respectively, to the supporting channel shaped arms 58 and 59.

A hydraulic cylinder 118 is provided with a bracket means 119 which is fixed to the rotatable cross sleeve 60 by means of a hinge pin 120. The pin 120 joins one end of the cylinder with the bracket 119. The container or bracket 104 is provided with a central passage 121 for the purpose of slidably receiving the hydraulic cylinder 118. A piston rod 122 extends longitudinally from the cylinder 118 and is adapted to slide through an aperture 123 in the bracket 109. The end of the container 104 opposite the attachment of the springs 102 and 103 is designated by the numeral 124 and is adapted to snugly slide on the piston rod 122. A collar 125 is mounted on the piston rod 122 and by means of a pin 125a joins the collar 125 to the piston rod 122 in abutting relation to the container portion 124 whereby extension or retraction of the piston 122 will cause a shifting of the spring container 104 substantially longitudinally of the harvesting machine, thus regulating the extension of the springs 102 and 103.

Springs 126 and 127 are fastened at one end at 128 and 129, respectively, on lugs 130 and 131 which are welded or otherwise fastened to the rotatable sleeve 60. The other ends of the springs extend forwardly and upwardly and are attached at 132 and 133 on the side frame members of the machine of this invention. The springs 102 and 103 are expressly for the purpose of urging the harvesting augers and their respective disk cutters downwardly into the ground. Thus the extensions of the springs 102 and 103 vary the force at which the augers will be urged downwardly. As previously stated, it is the object of this invention, and for that matter of all cane harvesters, to cut the cane stalks closely adjacent the root of the plant without destroying the root. In relatively loose soil, the force required to urge the harvesting augers downwardly is reduced to a minimum and it is necessary to readjust the extensions of the springs 102 and 103 to prevent the augers from burying themselves and thereupon cutting and removing the entire cane plant roots. When the cutter discs and their augers strike an immovable object the discs and augers are allowed a slight rearward swinging by reason of the rearward swinging of the downwardly depending pivoted arms 61. The springs 126 and 127 tend to hold the arms 61 in their forward position and thus the augers "climb" over the immovable object in the field and quickly resume their normal position once the object is cleared by the cutting discs. A stop 61a is provided in the form of a depending bracket from the side frame members 11. The stop 61a limits rearward swinging movement of the arms 61 and thus of the disc cutters and their augers.

Spaced apart arms 134 and 135 are hingedly mounted on enlarged portions 136 and 137 of the stub shafts 110 and 111 respectively. The other ends of the arms 134 and 135 are pivotally attached at 138 and 139 on forwardly and downwardly extending brackets 140 and 141. A pipe or tubular frame member 142 spans the spaced apart side frames. The brackets 140 and 141 are fixedly attached to the cross pipe support 142. The attachment of the bracket 140 is shown at 143. The bracket means 109, which moves longitudinally within the cooperative track members 114 and 115, thus has its position controlled by reason of the hingedly mounted arms 134 and 135. As the bracket means 109 is more or less extended depending upon the position of the piston rod 122 of the hydraulic cylinder 118, the arms 134 and 135 thus swing about their upper pivots 138 and 139. The springs 102 and 103 exert a pulling force upon the bracket means 109 toward their anchor points 105 and 106 within the container 104. The fixed link arms 134 and 135 thus cause a downward movement of the substantially vertically disposed auger harvesting members. The linkage is a jack-knife or toggle arrangement, and as the angle between the arms 134 and 135 and the arms 58 and 59 decreases the harvesting elements move upwardly. Upon such upward movement the extension of the springs 102 and 103 increases thus compensating for the relatively lesser mechanical advantage of the jack-knife linkage. Thus when the springs 102 and 103 have been loaded to the predetermined amount by retraction of the piston rod 122 and engagement of the portion 124 of the container 104 by the collar 125 the springs, in combination with the linkage, thus provide a cam-like mounting which controls the butt cutter torque load so that the torque required to rotate the butt cutters is relatively constant and does not very greatly as the torque screw runs up and down through the torque drive.

As best shown in Fig. 1, a reciprocably movable rod 145 is vertically disposed and is hinged at 146 on the channel track member 114. Guide members 147 and 148 are vertically spaced apart and receive the rod 145 for slidable movement. The guide member 147 is carried on the frame member 38 and the guide member 148 is mounted on the side frame member. A swivel connection or universal joint 149 is provided in the rod 145 at a position spaced above the hinged connection 146. Arcuate swinging movement of the track 114 about the cross sleeve 60 will thus not cause a binding of the rod 145 within the spaced apart guides 147 and 148. An actuator member or trip block 150 is fastened to the rod 145 and is preferably disposed between the guide members 147 and 148. Electrical switches 151 and 152 are vertically spaced apart and mounted on the side frame. A switch arm 153 is provided on the switch 151 and similarly a switch operating arm is provided on the switch 152. In the operation of the cane harvester through a field of standing cane, as the auger harvesting units and the butt cutters seek to find their proper vertical level as determined by the torque resistance, the rod 145 with its actuator member 150 will be directly raised or lowered in response to the vertical swinging of the arms 58 and 59 about the sleeve member 60. When the actuator member 150 moves upwardly, it will contact the switch arm 153 of the electrical switch 151, and similarly as the rod 145 and its actuator member 150 move downwardly, the member 150 will contact the arm 154 to effect an energizing of its respective electrical switch 152.

Electrical limit switches 155 and 156 are mounted on the machine frame at the front end thereof and are equipped with actuating arms 157 and 158 respectively. In the same manner as the switch arms 153 and 154 are engaged by the actuating member 150, the switch arms 157 and 158 are engaged for actuation by the cross arm 23. As will be hereinafter described, the function of the electrical switches 151 and 152 is to energize hydraulic means for vertically raising and/or lowering the frame 10 of the cane harvester with respect to the front bolster members 20 and 22. Similarly the function of the electrical switches 155 and 156 is to deenergize the hydraulic means for vertically raising and/or lowering the frame 10 of the cane harvester with respect to the front bolster members 20 and 22 at the end of vertical travel.

As best shown in Fig. 6, a slide valve 159 is actuated by solenoids 160 and 161 which are energized by reason of the electrical switches 151 and 152. A piston 162 projects from both sides of the slide valve 159 and is engaged with the solenoids 160 and 161 for slidable movement therewith. The electrical switches 155 and 156 are normally closed and pass electrical current until such time as either of the switch arms 157 and 158 is actuated whereupon the electrical circuit is broken and the previously energized solenoids 160 or 161 become inactive. Contrarily, the electrical switches 151 and 152 are normally open and one of the switch arms 153 or 154 must be engaged before there is a completion of an electrical circuit.

A fluid reservoir 163 is adapted to contain fluid for the hydraulic system of this cane harvester. A pump 164 of the rotor type is adapted to draw fluid from the reservoir 163 and deliver it under pressure to any desired location. A conduit 165 joins the reservoir 163 to the pump 164 and similarly a conduit 166 is attached to the pump 164 and to a main control valve 167. A by-pass conduit 168 containing an over-load release valve 169 surrounds the fluid pump 164, and in the event an excessive amount of pressure is built up by the fluid on the pressure side of the pump 164, the valve 169 will automatically open and permit return of the fluid to the reservoir 163.

The main control valve 167 is the single manually operable device of the combination hydraulic and electrical system to control the operating adjustments of this cane harvester. The valve 167 includes a housing 170, a slide valve 171, and an operating extension or piston 172 which extends laterally out one end of the housing 170. A hand-engaging lever 173 is pivoted at 174 on a bracket 175 which is fixed to the valve housing 170. The hand lever 173 pivotally engages the slide valve extension 172 at 176 and thus as the lever 173 is rocked about its pivot mounting 174 the slide valve 171 will move through the housing 170 to any desired position.

A conduit 177 is joined to the valve 167 and to one end of the hydraulic cylinder 118. Similarly, a conduit 178 is joined to the valve 167 and to the other end of the hydraulic cylinder 118. A pressure gauge 179 is positioned within the conduit 178 and it is the direct reading of this gauge 179 which determines the degree of extension of the springs 102 and 103 and thus the degree of torque necessary to effect a raising of the butt cutter harvesting units. It is thus evident that movement of the hand lever 173 controls the extension of the piston 122 of the hydraulic cylinder 118 and thus varies the extension of the springs 102 and 103.

A conduit 180 is also connected to the valve 167 and is adapted to carry fluid under pressure to the slide valve 159. The energizing of the solenoids 160 and 161 controls the lateral positioning of the slide valve member 181 within the slide valve 159. A conduit 182 is connected to the valve 159 and to the top end 183 of the hydraulic cylinder 32. A second conduit 184 joins the valve 159 with the lower end 185 of the hydraulic cylinder 32. In order to complete the hydraulic system of the harvester of this invention a conduit 186 is adapted to join the valve 159 and the reservoir 163 whereby when fluid from the hydraulic cylinder 32 is drawn back into the slide valve, it may be discharged and redelivered to the reservoir 163.

The electrical circuits provided in combination with the hydraulic system for the present harvester employ a master switch 189 which remains open until such time as it is desired to operate the machine. A source of electromotive force such as a battery is shown at 190 and is adapted to supply the electrical energy for the valve operating solenoids 160 and 161. In the operation of the device, the operator initiates propulsion of the harvester through a field of standing crop stalks, and depending upon the density of the soil in which the crop is growing, the operator will manually adjust the hand lever 173 to a position wherein the pressure gauge 179 indicates a certain torque required to raise the auger type harvesting units at the forward end of the harvester. The gauge 179 is preferably calibrated to directly indicate the torque which will be necessary to effect a raising of the stalk butt cutters. This is possible inasmuch as the retraction of the piston rod 122 from the hydraulic cylinder 118 directly controls the extension of the springs 102 and 103 against which the auger harvesting units are raised. No further manual control is required to effect harvesting of stalks by this machine. The butt cutting disks 46 and 47 will engage the ground adjacent the roots of the stalks with a force commensurate with the extension of the springs 102 and 103 and the unbalanced weight of the butt cutter carrier assembly. When rotation of the butt cutters 46 and 47 is resisted sufficiently to overcome this predetermined downward force, the auger conveyors 50 and 51 will automatically climb up the screw helixes provided in the screw and nut driving mechanism at the upper ends of the auger shafts within the gear housings 90 and 96. The immediate reaction is to cause an upward swinging of the auger carrying arms 58 and 59 and almost immediate engagement of the electrical switch arm 153 by the actuating member 150. It is preferable that the range of movement of the auger harvesting units be limited to approximately two inches above and two inches below the normal relationship to the harvester frame 10, in order to maintain the best feeding arrangement between the vertical augers to the feed rollers. The lowermost position of the butt cutters 46 and 47 is shown in dash lines at 192 and the uppermost position is similarly shown in dash lines at 193 in Fig. 1. It should be understood that the movement shown is with relation to the harvester frame 10 and not with respect to the ground, as it is the undulations of the ground which move and position the butt cutters. These limiting movements of the cutter disks 46 and 47 are based solely upon the angular swinging of the arms 58 and movement of the actuating member 150 prior to engagement of either of the electrical switch arms 153 and 154 and are not the maximum limit positions of the disk cutters 46 and 47 with respect to the ground line 191. Thus when either of the electrical switch arms 153 or 154 is actuated, more or less fluid will be admitted to the hydraulic cylinder 32 to cause a direct raising and/or lowering of the main frame 10 with respect to the ground. This then maintains the relative positioning of the auger harvesting members with respect to the main frame. The augers are permitted separate and independent movement only throughout a slight range above and below the normal level of the cutting disks with respect to the main frame beyond which the main frame of the harvester moves with the augers.

There are also limit means provided for movement of the main frame 10 of the harvester. These limit means are in the form of electrical switches 155 and 156 which are actuated by control arms 157 and 158. The switches are mounted on the main frame and actuated by vertical movement of the center of the equalizer bar 23 with respect to the main frame. Thus as the equalizing tie bar 23 moves up and/or down, it will strike the switch actuating arms 157 or 158, and thus the electrical circuits which were previously closed by actuation of either of the switch arms 153 or 154 will be broken and thus the slide valve 181 will return to a neutral position wherein fluid will be neither admitted nor removed from the hydraulic cylinder 32. It is thus apparent that the electrical switches 155 and 156 are superimposed upon the electrical circuits which have initially been completed by actuation of either of the electrical switches 151 and 152. There is thus provided limit stop means, first with respect to the independent movement of the augers, and second with respect to the joint movement of the augers and main frame of the cane harvester.

It is apparent therefore that the harvester of this invention provides cooperative butt cutter disks with vertically disposed stalk lifting augers immediately thereabove which will be vertically positioned with respect to the butt ends of the stalks dependent upon the amount of torque required to rotate the butt cutting disks. This torque, as previously explained, may be manually adjustable by movement of the hand lever 173 which controls a hydraulic slide valve 167, the operation of which directly controls the extension or contraction of the springs 102 and 103 which supply the force by which the harvesting elements are urged downwardly. In the event the torque becomes excessive, the disk cutters and augers will climb and seek a level commensurate with the amount of torque required to cut through the stalks and top soil to the predetermined depth. After the extension of the springs 102 and 103 is initially set by the operator for any particular field, he is not usually required to change this setting and yet the machine will automatically operate to cut and harvest stalks at the lowest feasible level on the butt end of the stalk to obtain the greatest quantity of sugar when harvesting cane.

There are occasions when foreign objects such as rocks or mahogany stumps are in a cane field, and when the harvesting elements of this cane harvester strike such solid obstructions they are permitted a slight rearward yielding swinging from their universal mountings within the gimbal rings 93 and 97. During the rearward swinging the butt cutters and their augers will climb up and over the rock in the same manner that they seek their level in the ground.

In the diagrammatic view of the control mechanism as shown in Fig. 6, there is provided self-aligning coupling means 194 and 195 between the solenoids 160 and 161 and their connections to the valve spool extension rod 162 for sliding operation of the slide valve 181. There are two electrical circuits in the system having the main control switch 189. After the switch 189 is closed, electric power is capable of being delivered from the battery 190 to either of the solenoids 160 or 161 dependent upon the closing of one of the electrical switches 151 and 152. The electrical switches 151 and 155 are in series arrangement with the solenoid 160 so that if either of the switches is open there is no completion of the electrical circuit and thus no energizing of the solenoid 160. Similarly the electrical switches 152 and 156 are in series with the solenoid 161 and therefore both of these switches must be closed in order to complete the circuit and energizing of the solenoid 161. It is thus apparent that the cane harvester of this invention includes a combination electrical and hydraulic control system which operates to effectively control the harvesting of cane.

When piston rod 122 is extended its full distance from cylinder 118 rollers 112 and 113 move along tracks 114 and 115, and arms 134 and 135 swing about pivot attachments 138 and 139 forcing arms 58 and 59 to rotate about shaft 60a which causes augers 50 and 51 to rise to transport position by forcing shafts 48 and 49 to rise through nuts 83 in bevel gear cases 90 and 96.

This movement of arms 58 and 59 causes actuating member 150 to close switch 151 through arm 153 which causes liquid to be delivered to cylinder 32 forcing piston rod 34 to force equalizer arm 23 to its lowest position with respect to the frame 10. The full movement of equalizer arm 23 causes normally closed switch 156 to open through arm 158, cutting off current to solenoid actuated valve 159 and allowing the self-centering valve to return to neutral, thus locking cylinder 32.

One of the principal reasons for employing the particular type of auger carriers is to maintain proper timing of the augers. This timing is inaugurated through drive chains (not shown) which deliver rotational drive to the sprockets 88 and 98. Shafts 48 and 49 are forced to rise together and equally through nuts 83.

It should be noted that rotation of the shafts 48 and 49 must accompany any rise or fall through nuts 83, and the rotation of shafts 48 and 49 must be equal in order to maintain substantial timing of augers 50 and 51.

Numerous details of construction may be varied throughout a wide range without departing from the principles disclosed herein, and we therefore do not propose limiting the patent granted hereon otherwise than as necessitated by the appended claims.

What is claimed is:

1. A butt cutter for cutting stalks close to the ground, comprising a substantially vertically disposed shaft having cutting means adjacent its lower end, said shaft having a threaded portion above said cutting means, a power driven nut engaging said threaded portion for causing rotation of said shaft, the pitch of said threads being sufficient to cause driving of said cutter in the cutting of stalks but insufficient to drive said cutter when encountering the ground, and continued rotation of said nut will cause lifting of said shaft and cutter.

2. A device as set forth in claim 1 in which a frame supporting structure is provided for carrying said butt cutter and its vertically disposed shaft, and spring means on said frame supporting structure arranged to normally urge said butt cutter into ground engagement.

3. A device as set forth in claim 2 in which means is provided for directly varying the tension of said spring means.

4. A device as set forth in claim 3 in which a toggle linkage mechanism is provided in association with said shaft and said frame supporting structure, said spring means engaging said toggle linkage and urging said shaft and butt cutter downwardly.

5. A device as set forth in claim 1 in which there is included a frame, wheels supporting said frame, means associated with said frame and said vertically disposed shaft for carrying the shaft with the frame, said means including a first arm having one end thereof hinged on said frame, said shaft attached to said first arm at a position spaced from the hinging to the frame, a second arm having one end hinged on said frame at a position spaced forwardly and above said first arm hinging, means joining the outer ends of the first and second arms whereby the second arm may have slidable movement with respect to the first arm to transmit a downward swinging movement to the first arm and thus a corresponding downward movement of the butt cutter.

6. A device as set forth in claim 5 in which spring means is fastened at one end to the outer end of the second arm and anchored at its other end to said frame adjacent the hinging of the first arm.

7. A device as set forth in claim 5 in which the means joining the outer end of the second arm to the first arm includes inwardly opening channel shaped track members integral with and extending along the first arm, and cooperative track engaging means on the outer end of said second arm, said cooperative track engaging means arranged and constructed to slide within the channel shaped track and swing the first arm upwardly and/or downwardly.

8. A device as set forth in claim 1 in which the power driven nut has a bevel gear externally thereof for receiving driving rotation.

9. A device as set forth in claim 8 in which a second bevel gear is vertically disposed and engages the bevel gear on the power driven nut, and an annular ring well means surrounding the vertically disposed shaft and receiving the depending portion of said second bevel gear, whereby when lubricant is placed in said annular ring well means all of the gears are properly lubricated.

10. A device as set forth in claim 1 in which there is included a frame supporting structure and a pair of cutting means and vertically disposed shafts carried on said frame supporting structure.

11. A device as set forth in claim 1 in which there is included a main frame, a pair of cooperating cutting means and associated vertically disposed shafts, a carrier frame for said vertically disposed shafts hinged to said main frame, spring means arranged and constructed to be effective intermediate said main frame and said carrier frame to urge said vertically disposed shafts and their cooperating cutting means downwardly against their normal upward urging by the driving of the threaded portions by the power driven nuts, wheel supports for said main frame shiftable vertically with respect to said main frame, first hydraulic means for varying the effectiveness of the spring means, and second hydraulic means for raising or lowering the main frame with respect to the wheel supports.

12. A device as set forth in claim 11 in which the first hydraulic means is manually adjustable to any desired setting.

13. A device as set forth in claim 12 in which means is provided for effecting actuation of said second hydraulic means in response to a predetermined relative vertical movement between said carrier frame and said main frame, said last named means including electrical switch means positioned between the carrier frame and the main frame.

14. A device as set forth in claim 13 in which means is provided on said main frame for limiting relative movements of the main frame with the wheel supports, and said last named means including auxiliary electrical switch means.

15. A device as set forth in claim 14 in which said electrical switch means and said auxiliary electrical switch means include electrical solenoids and the first hydraulic means and the second hydraulic means include slide valves directly shiftable in response to action by said electrical solenoids.

References Cited in the file of this patent

UNITED STATES PATENTS

| | | |
|---|---|---|
| 432,650 | Terman | July 22, 1890 |
| 773,279 | Dewey | Oct. 25, 1904 |
| 820,730 | Pessou | May 15, 1906 |
| 1,457,829 | Erhardt | June 5, 1923 |
| 1,517,559 | Hartenstein | Dec. 2, 1924 |
| 1,620,019 | Hammer et al. | Mar. 8, 1927 |
| 1,664,203 | Flynn | Mar. 27, 1928 |
| 1,675,903 | Murphy | July 3, 1928 |
| 1,819,697 | Boudette | Aug. 18, 1931 |
| 1,975,089 | Falkiner et al. | Oct. 2, 1934 |
| 2,216,313 | Fulton | Oct. 1, 1940 |
| 2,222,699 | Ball | Nov. 26, 1940 |
| 2,281,904 | Wurtele | May 5, 1942 |
| 2,333,153 | Crow | Nov. 2, 1943 |
| 2,476,910 | Read | July 19, 1949 |
| 2,510,242 | Minns et al. | June 6, 1950 |
| 2,530,796 | Weyant | Nov. 21, 1950 |
| 2,539,881 | Wilkins | Jan. 30, 1951 |

FOREIGN PATENTS

| | | |
|---|---|---|
| 498,791 | Belgium | Feb. 15, 1951 |